J. A. LUCAS.
VALVE.
APPLICATION FILED AUG. 14, 1916.
1,237,922.
Patented Aug. 21, 1917.
2 SHEETS—SHEET 1.
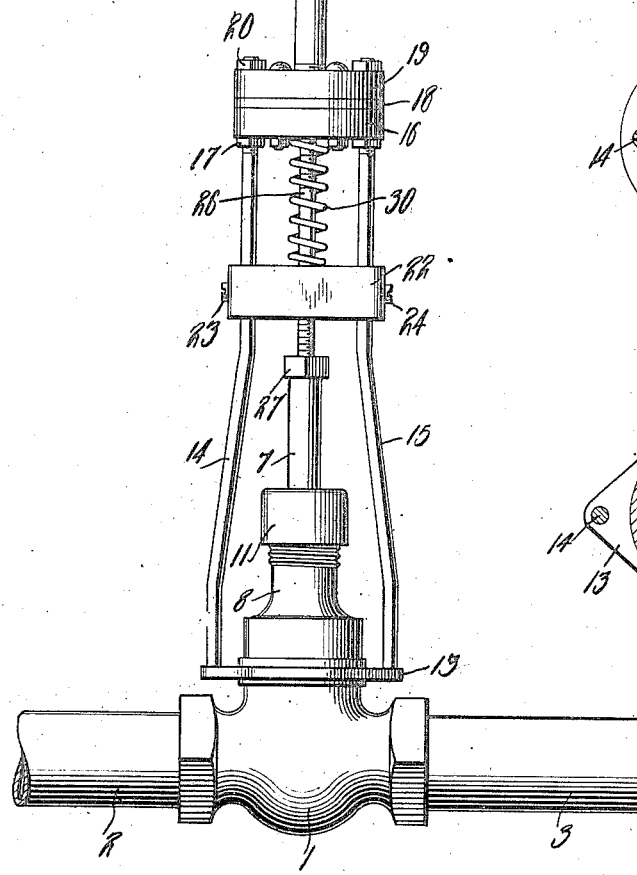
Fig. 1.
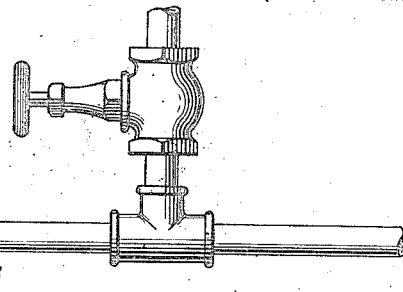
Fig. 3.
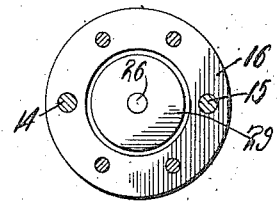
Fig. 4.
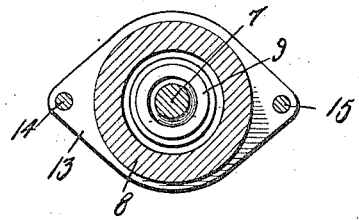
Witnesses
W. C. Fielding
Lloyd W. Patch
Inventor
John A. Lucas
By Richard B. Owen
Attorney

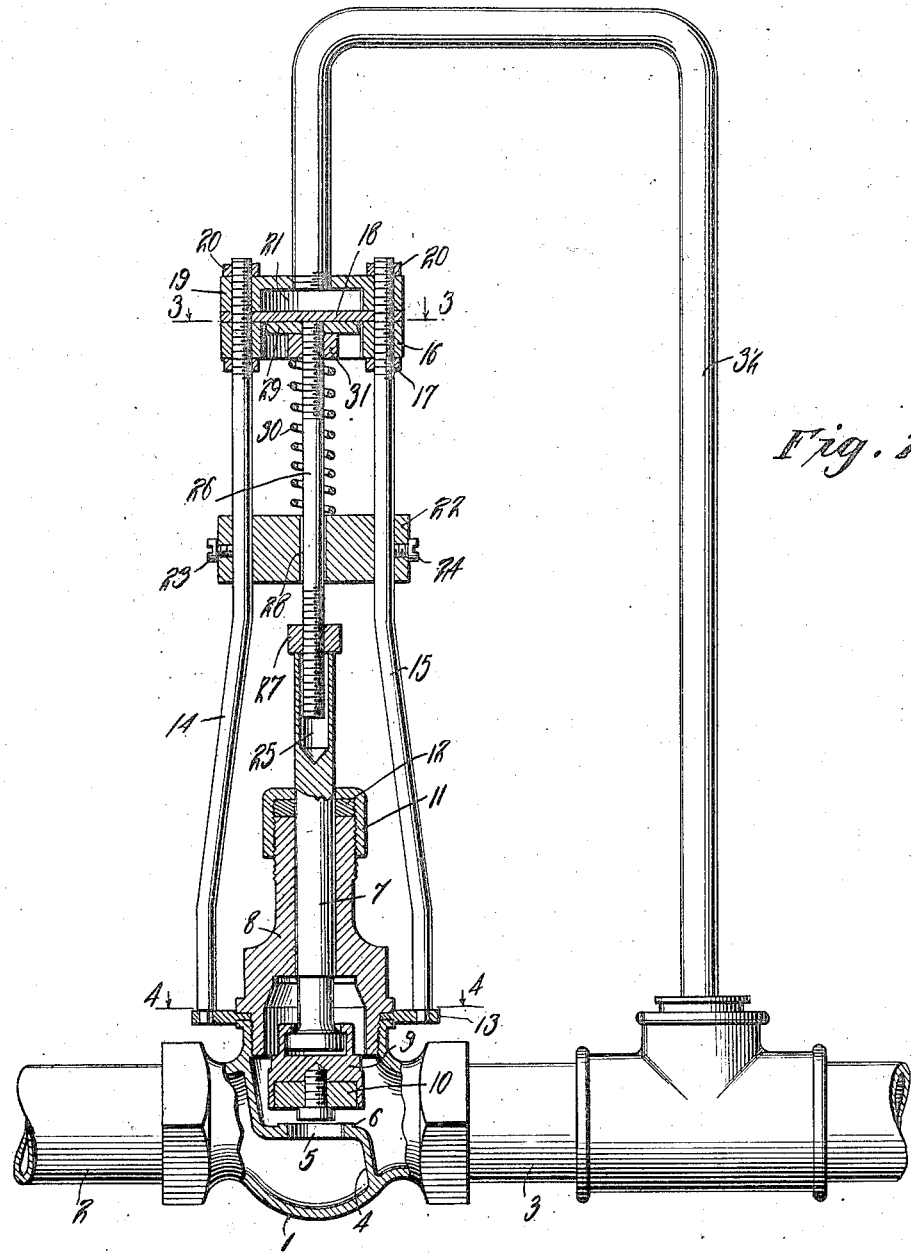

a # UNITED STATES PATENT OFFICE.

JOHN A. LUCAS, OF ALLISON, PENNSYLVANIA.

VALVE.

1,237,922.  Specification of Letters Patent.  Patented Aug. 21, 1917.

Application filed August 14, 1916. Serial No. 114,836.

*To all whom it may concern:*

Be it known that I, JOHN A. LUCAS, a citizen of the United States, residing at Allison, in the county of Fayette and State of Pennsylvania, have invented certain new and useful Improvements in Valves, of which the following is a specification.

This invention relates to an improvement in valves and more particularly to pressure regulated valves, and it is a purpose of my invention to provide a device which may be used for a reducing valve, a pump governor, water regulator valve, or as a valve in many other connections, and which will require no oil or lubricant and will have only one stuffing box where the fluid being controlled could escape.

A further object is to so construct the valve and the control therefor that the connecting rod from the diaphragm to the valve is entirely separate from the diaphragm thus permitting the use of ordinary sheet packing or other suitable material when the diaphragm becomes worn or for any other reason is to replaced, and to so construct the adjustments for the connecting rod and the valve stem that a very wide range of pressure regulations may be accomplished.

With the above and other objects in view, my invention consists in certain novel features of construction and combinations of parts which will be hereinafter set forth in connection with the drawings and then more particularly pointed out in the claims.

In the drawings:

Figure 1 is a view in side elevation showing my improved valve connected in one adaptation of the same.

Fig. 2 is a view in elevation with portions shown in vertical section to illustrate a varied use of the valve.

Fig. 3 is a transverse sectional view taken on the line 3—3 of Fig. 1.

Fig. 4 is a similar sectional view taken on the line 4—4 of Fig. 1.

This valve is adapted to be used for the control of and to be actuated by water, air, steam, or any other fluid under pressure, and might be used as a reducing valve, applied as a pump governor, connected in conjunction with a water regulator valve, or fitted in various other connections without changes in the structural elements or in the manner of assembling, and hence I have shown only certain specimen mountings to better disclose the manner in which the valve would be fitted in use.

The valve body 1 is of the ordinary globe valve type, and has the inlet pipe 2 connected at one side and the outlet pipe 3 connected at the opposite side, the valve partition 4 having the fluid passage 5 formed therethrough with the valve seat 6 around the passage. The valve stem 7 is mounted through a stem casing 8 which is secured in conjunction with the main valve casing and this stem 7 has a swivel head 9 thereon which is fitted with the packing washer 10 adapted to close down upon the seat at 6 when the stem 7 is moved inwardly or downwardly. A packing nut 11 is mounted around the stem 7 on the outer end of the stem casing 8 to confine and compress the packing material as indicated at 12, and in this way leakage of the valve is prevented around the stem and at the same time movement of the valve stem to bring the packing washer 10 to a seated position upon the valve seat 6 in which relation it closes the fluid passage at 5 is not in any way interfered with.

A base member 13 is secured in place on the valve casing structure by being confined between the main casing 1 and the stem casing 8, and the rods 14 and 15 extend upwardly from this base member 13 to form a supporting cage structure. The upper ends of these rods 14 and 15 are brought in and are extended in parallel relation and at their extreme ends are screw threaded as is better shown in Fig. 2. A diaphragm casing ring 16 is mounted on the rods 14 and 15 to be held at the proper height by the nuts 17 which are screwed onto the threaded ends of these rods, and a flexible diaphragm 18 is placed on this ring, a casing member 19 being mounted over the ends of the rods 14 and 15 to bear down upon this diaphragm and being confined in place by the clamp nuts 20 so that an expansion chamber 21 is provided above the diaphragm. A cross head 22 is mounted on the parallel extent of the rods 14 and 15 below the mounting of the diaphragm, and is arranged to be capable of sliding movement to be adjusted toward and away from the diaphragm, the set screws 23 and 24 being provided to secure the various adjustments of the cross head.

The upper end of valve stem 7 has the bore 25 formed therein and a connecting rod 26, which is screw threaded at its ends, has the lower end thereof fitted in the bore 25, an adjusting nut 27 being provided to regulate the extension of the connecting rod into the bore of the valve stem 7. The cross head 22 has a bearing opening 28 therethrough through which the connecting rod 26 is mounted to be capable of sliding movement and thus the upper end of this connecting rod is brought to a position beneath the diaphragm 18, a head 29 being provided on the upper end of this connecting rod to bear against the lower side of the diaphragm and to thus cause movement of the connecting rod as the diaphragm may be distended. The diaphragm 18 will hold the head 29 against excessive upward movement and thus through adjustment of the nut 27, the height to which the valve stem 7 is permitted to rise, can be regulated to secure positive adjustment of the maximum opening permitted for the valve. A coil spring 30 is mounted around the upper extent of the connecting rod 26 above the cross head 22 and a tension nut 31 is connected on the upper screw threaded end of this connecting rod 26 to be adjusted against the spring 30 to vary the bearing pressure exerted by the same.

In the use of the device, the valve is connected in the pipe line in which it is desired to control the fluid flow, and in adaptations where the device is to be used as a reducing valve and pressure regulator, the high pressure inlet will be at 2 and the low pressure outlet at 3, as the parts are illustrated in Fig. 2, and in this connection a fluid return pipe 32 is connected from the low pressure outlet side to the diaphragm chamber at 21 so that as the pressure becomes excessive on the low pressure side of the valve, this fluid under pressure will flow back to the pipe 32 to the diaphragm expansion chamber at 21 and will consequently cause deflection of the diaphragm to move the connecting rod 26, this movement being transmitted to the valve stem 7 through the adjusting nut 27 and the valve opening or the fluid passage of the valve being thus constricted. As is shown in Fig. 1, the pipe to the diaphragm expansion chamber as indicated at 33 might be connected with an independent source of fluid supply and other variations might be made, it of course being understood that the fluid conducting connections will be accomplished in a manner thus suited to the particular adaptation in which the device is being used. As the excessive pressure is again reduced, the spring 30 will cause return movement of the stem 26 and consequently the valve 9 will be raised high from its seat by the pressure of the fluid passing through the valve and in this way an automatic regulation will be accomplished. It will of course be understood that the adjusting nut 27 can be set at any point along the screw threaded lower end of the connecting rod 26 and in this way the maximum opening of the valve may be varied, and also the tension nut 31 may be adjusted downwardly against the coil spring 30 to increase the tension of the spring and to thus raise the resistance of the spring to such a degree that a higher pressure of fluid in the diaphragm expansion chamber 21 will be needed to cause deflections of the diaphragm 18 which will bring about downward movement of the connecting rod 26 to a sufficient degree to affect the valve.

From the foregoing it will be seen that I have provided a valve which will adapt itself readily to a various number of uses as it is constructed to be capable of connection in a number of structures and which at the same time presents a structure permitting a wide range of pressure regulations thus allowing very accurate and sensitive setting of the parts.

While I have then shown and described only one specific construction and arrangement of the parts of the valve structure proper and the regulating structure therefor, and have described only specific connections in which the device could be used, it will of course be understood that a number of variations and modifications might be resorted to in the form and arrangement of the several parts and in the manner of connecting the device in use, without departing from the spirit and scope of my invention, and hence I do not wish to be limited to the exact disclosure, but rather only to such points as may be set forth specifically in the claims.

I claim:

1. A valve comprising a valve casing, a valve mounted in said casing and having a stem extending therefrom, a diaphragm casing carried adjacent the valve casing and having a diaphragm mounted therein, a connecting rod arranged in line with the valve stem mounted to have movement transmitted thereto from the diaphragm as fluid pressure in the diaphragm casing is varied, and an adjusting nut fitted on the connecting rod to bear against the valve stem and through adjustment along the rod to give corresponding adjustment to the maximum opening of the valve.

2. A valve comprising a valve casing, a valve mounted in said casing and having a stem extending therefrom, a supporting structure mounted on said valve casing to extend beyond the stem, a diaphragm casing mounted on the supporting structure, a diaphragm carried by said diaphragm casing, a connecting rod mounted in alinement with the valve stem and arranged to receive movement from the diaphragm as the same is moved through variation of fluid pressure in the diaphragm casing, and an adjusting nut mounted on the connecting rod and bearing against the valve stem to impart movement thereto from the diaphragm and to give adjustment to the maximum opening of the valve.

3. A valve comprising a valve casing, a valve mounted in said casing to be opened by fluid pressure and having a stem extending from the casing, a supporting structure mounted upon said valve casing, a diaphragm casing mounted on the supporting structure and having a diaphragm carried thereby, a connecting rod mounted in line with the valve stem and arranged to have movement transmitted thereto from the diaphragm, an adjusting nut mounted on the connecting rod to bear against the valve stem and transmit movement thereto upon distension of the diaphragm, and a spring mounted to normally hold the connecting rod in a position that the valve may be freely moved from a closed position subject to limitation of the opening movement by the adjusting nut.

4. A valve comprising a casing, a valve mounted in said casing and provided with a stem, a valve stem casing through which the stem is passed and by which the same is held in a proper path of movement to seat the valve, a supporting structure carried from the valve casing and extended beyond the outer end of the stem, a diaphragm casing having a diaphragm mounted therein arranged on said supporting structure, a connecting rod mounted in conjunction with said supporting structure in line with the valve stem to bear thereagainst and provided with a head to be engaged by the diaphragm upon deflection of the same and to consequently impart movement to the valve stem to close the opening of the valve, and an adjusting nut fitted on the connecting rod and bearing against the valve stem to give adjustment to the maximum opening of the valve.

5. A valve comprising a casing, a valve mounted in said casing and provided with a stem having a bore in the outer end thereof, a valve stem casing through which the stem is passed and by which the same is held in a proper path of movement to seat the valve, a supporting structure carried from the valve casing and extended beyond the outer end of the stem, a diaphragm casing having a diaphragm mounted therein arranged on said supporting structure, a connecting rod mounted in conjunction with said supporting structure in line with the valve stem to be received in the bore thereof and provided with a head to be engaged by the diaphragm upon deflection of the same, an adjusting nut fitted on the connecting rod in a position to bear against the outer end of the valve stem to give adjustment to the maximum opening of the valve and to cause the valve to be closed upon distension of the diaphragm, and means connected around said connecting rod to resiliently oppose movement of the same under the impelling action of the diaphragm as the same is distended.

6. A valve comprising a casing, a valve mounted in said casing and provided with a stem, a valve stem casing through which the stem is passed and by which the same is held in a proper path of movement to seat the valve, a supporting structure carried from the valve casing and extended beyond the outer end of the stem, a diaphragm casing having a diaphragm mounted therein arranged on said supporting structure, a connecting rod mounted in conjunction with said supporting structure in line with the valve stem and provided with a head to be engaged by the diaphragm upon deflection of the same, an adjusting nut fitted on the connecting rod to bear against the valve stem to give adjustment to the maximum opening of the valve and to cause the same to be closed upon distension of the diaphragm, means connected around said connecting rod to resiliently oppose movement of the same under the impelling action of the diaphragm as the same is distended, and tension adjusting means arranged on the connecting rod to vary the settings of the means resiliently opposing movement of said rod to thus accomplish variations of the pressure required to distend the diaphragm sufficiently to impart closing movement to the valve.

7. A valve comprising a casing, a valve mounted in said casing and provided with an elongated stem having a bore in the end thereof, a stem casing mounted around said stem and connected with the valve casing in a manner that a portion of the stem extends therefrom, a supporting structure mounted in conjunction with the valve casing extended substantially parallel with and beyond the stem, a diaphragm casing connected on the supporting structure beyond the end of the valve stem, a cross head mounted on the supporting structure, a connecting rod mounted through said cross head to be capable of sliding movement and having the ends thereof screw threaded, a head on the outer end of said connecting rod arranged to bear against the outer side of the diaphragm in the diaphragm casing and free of connection therewith, the remaining end of the connecting rod provided with screw threads and arranged to be received in the bore of the valve stem, and an adjusting nut mounted on the screw threaded end of the connecting rod to bear against the outer end of the valve stem and limit the maximum opening of the valve while at the same time presenting a structure which will act to close the valve as fluid is supplied under pressure to the diaphragm chamber.

8. A valve comprising a casing, a valve mounted in said casing and provided with an elongated stem having a bore in the end thereof, a stem casing mounted around said stem and connected with the valve casing in a manner that a portion of the stem extend therefrom, a supporting structure mounted in conjunction with the valve casing extended substantially parallel with and beyond the stem, a diaphragm casing connected on the supporting structure beyond the end of the valve stem, a cross head mounted on the supporting structure, a connecting rod mounted through said cross head to be capable of sliding movement and having the ends thereof screw threaded, a head on the outer end of said connecting rod arranged to bear against the outer side of the diaphragm in the diaphragm casing and free of connection therewith, the remaining end of the connecting rod provided with screw threads and arranged to be received in the bore of the valve stem, an adjusting nut mounted on the screw threaded end of the connecting rod to bear against the outer end of the valve stem and limit the maximum opening of the valve while at the same time presenting a structure which will act to close the valve as fluid is supplied under pressure to the diaphragm chamber, and a coil spring mounted around the connecting rod to bear against the cross head and to thus normally hold the head of the connecting rod placed against the diaphragm and at the same time resiliently oppose movement of the connecting rod under the force exerted by the diaphragm.

9. A valve comprising a casing, a valve mounted in said casing and provided with an elongated stem having a bore in the end thereof, a stem casing mounted around said stem and connected with the valve casing in a manner that a portion of the stem extend therefrom, a supporting structure mounted in conjunction with the valve casing extended substantially parallel with and beyond the stem, a diaphragm casing connected on the supporting structure beyond the end of the valve stem, a cross head mounted on the supporting structure, a connecting rod mounted through said cross head to be capable of sliding movement and having the ends thereof screw threaded, a head on the outer end of said connecting rod arranged to bear against the outer side of the diaphragm in the diaphragm casing and free of connection therewith, the remaining end of the connecting rod provided with screw threads and arranged to be received in the bore of the valve stem, an adjusting nut mounted on the screw threaded end of the connecting rod to bear against the outer end of the valve stem and limit the maximum opening of the valve while at the same time presenting a structure which will act to close the valve as fluid is supplied under pressure to the diaphragm chamber, a coil spring mounted around the connecting rod to bear against the cross head and to thus normally hold the head of the connecting rod placed against the diaphragm and at the same time resiliently oppose movement of the connecting rod under the force exerted by the diaphragm, and a tension nut mounted on the connecting rod to be adjusted down against the spring to vary the force exerted thereby to oppose movement of the connecting rod.

In testimony whereof I affix my signature in presence of two witnesses.

JOHN A. LUCAS.

Witnesses:
WILLIAM JOHNSON,
A. C. LANE.